(12) United States Patent
Takahashi et al.

(10) Patent No.: US 7,291,806 B2
(45) Date of Patent: Nov. 6, 2007

(54) ROBOT LASER PROCESSING SYSTEM

(75) Inventors: Hiromitsu Takahashi, Yamanashi (JP); Yoshitake Furuya, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 11/460,498

(22) Filed: Jul. 27, 2006

(65) Prior Publication Data

US 2007/0023404 A1 Feb. 1, 2007

(30) Foreign Application Priority Data

Jul. 29, 2005 (JP) ............................. 2005-220978

(51) Int. Cl.
*B23K 26/08* (2006.01)
*G06F 19/00* (2006.01)

(52) U.S. Cl. ........................... 219/121.78; 219/121.61; 219/121.76; 700/166

(58) Field of Classification Search ................ 700/166; 219/121.61, 121.62, 121.76, 121.78; 235/376
See application file for complete search history.

(56) References Cited

U.S. PATENT DOCUMENTS

| | | | | |
|---|---|---|---|---|
| 4,820,899 A | * | 4/1989 | Hikima et al. | 219/121.76 |
| 6,538,231 B2 | * | 3/2003 | Karube et al. | 219/121.76 |
| 6,555,784 B2 | * | 4/2003 | Iehisa et al. | 219/121.76 |
| 2001/0042737 A1 | | 11/2001 | Iehisa et al. | |
| 2006/0113375 A1 | * | 6/2006 | Caiger | 235/376 |

FOREIGN PATENT DOCUMENTS

| | | |
|---|---|---|
| EP | 0347860 A2 | 12/1989 |
| JP | 2001-259870 A1 | 9/2001 |
| JP | 2004-171540 A * | 6/2004 |

OTHER PUBLICATIONS

Search Report issued in corresponding foreign application dated Dec. 1, 2006.

* cited by examiner

*Primary Examiner*—Geoffrey S. Evans
(74) *Attorney, Agent, or Firm*—Lowe, Hauptman, Ham & Berner, LLP (57) ABSTRACT

A robot laser processing system (10) comprises at least one robot controller (14) for controlling at least one robot, a host controller (12) connected to the robot controller through a first network (11) for overall control of the robot controller, and a plurality of laser oscillators (16-1 to 16-*n*) selectively connectable to the processing nozzle (35) mounted on each robot and connected to the robot controller through a second network (18-1 to 18-*n*). An instruction from the host controller is transmitted to the robot controller through the first network, so that the robot controller determines the laser oscillator to be controlled and directly controls the particular laser oscillator through the second network. As a result, a processing command can be issued directly to the laser oscillator from the robot controller without intervention by the host controller.

5 Claims, 10 Drawing Sheets

ROBOT LASER PROCESSING SYSTEM

BACKGROUND OF THE INVENTION

1. Field of the Invention

This invention relates to a robot laser processing system using an industrial robot.

2. Description of the Related Art

A laser processing system having an industrial robot with a processing nozzle mounted thereon, to emit a laser beam for automatically performing the desired laser processing work, is used in various areas including car assembly plants and printed circuit board production factories.

In this laser processing system, demand is high for a configuration in which a plurality of laser oscillators different in rated output can be connected to a robot and switched in accordance with the applications and situations of a production field, or a configuration in which a second laser oscillator is connected in addition to an laser oscillator used for normal processing process and, if the oscillator for normal processing process fails for some reason, the system is switched to the second laser oscillator.

A configuration in which a plurality of laser oscillators are connected to the robot and switched for actual use is required to meet two main conditions.

Figure 6:
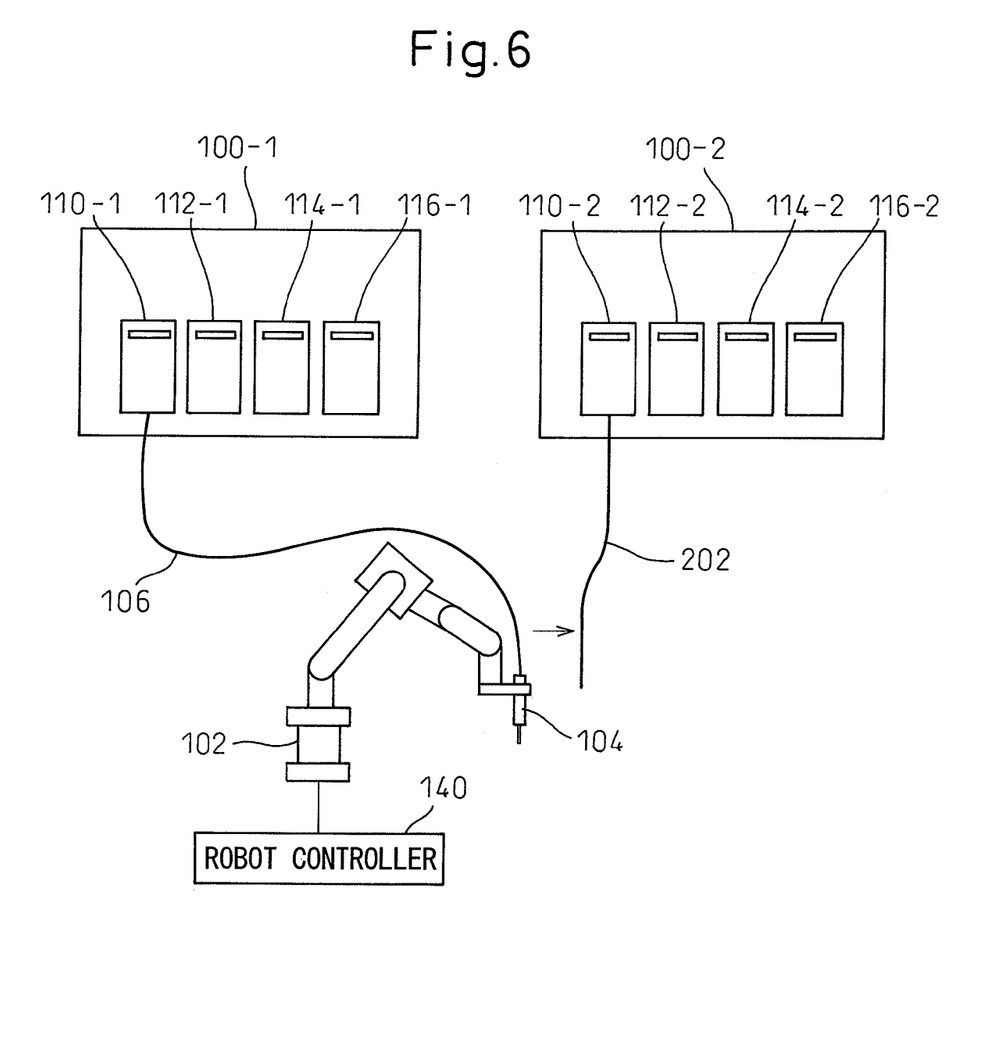
FIG. 6 is a diagram for explaining the operation of switching the laser oscillators.

With reference to FIG. 6, an explanation will be given of a case in which a first laser oscillator is switched with a second laser oscillator.

In FIG. 6, a robot 102 controlled by a robot controller 140 includes a robot arm having a plurality of rotatably coupled arm members. A processing nozzle 104 mounted at the forward end of the robot 102 is connected to a laser oscillator 100-1 through an optical fiber 106. In FIG. 6, the laser oscillator 100-1 has four shutters 110-1, 112-1, 114-1, 116-1. FIG. 6 also shows another laser oscillator 100-2 which similarly has four shutters 110-2, 112-2, 114-2, 116-2.

In order to switch the laser oscillators, an operation to switch the connection of the optical fiber 106 is required first. As shown in FIG. 6, in the case where the laser oscillator 100-1 connected to the processing nozzle 104 of the robot 102 is switched to a different laser oscillator 100-2, the fiber 106 connected to the laser oscillator 100-1 is removed from the processing nozzle 104 of the robot 102 and the optical fiber 202 for the laser oscillator 100-2 is connected to the processing nozzle 104. As an alternative, as shown in FIG. 7, the optical fiber 106 for the laser oscillator 100-1 may be reconnected to the laser oscillator 100-2 without removing the fiber 106 from the processing nozzle 104.

This connecting job, though carried out manually in many cases, may be conducted using an optical fiber switching device as described in Japanese Unexamined Patent Publication No. 2001-259870.

Figure 7:
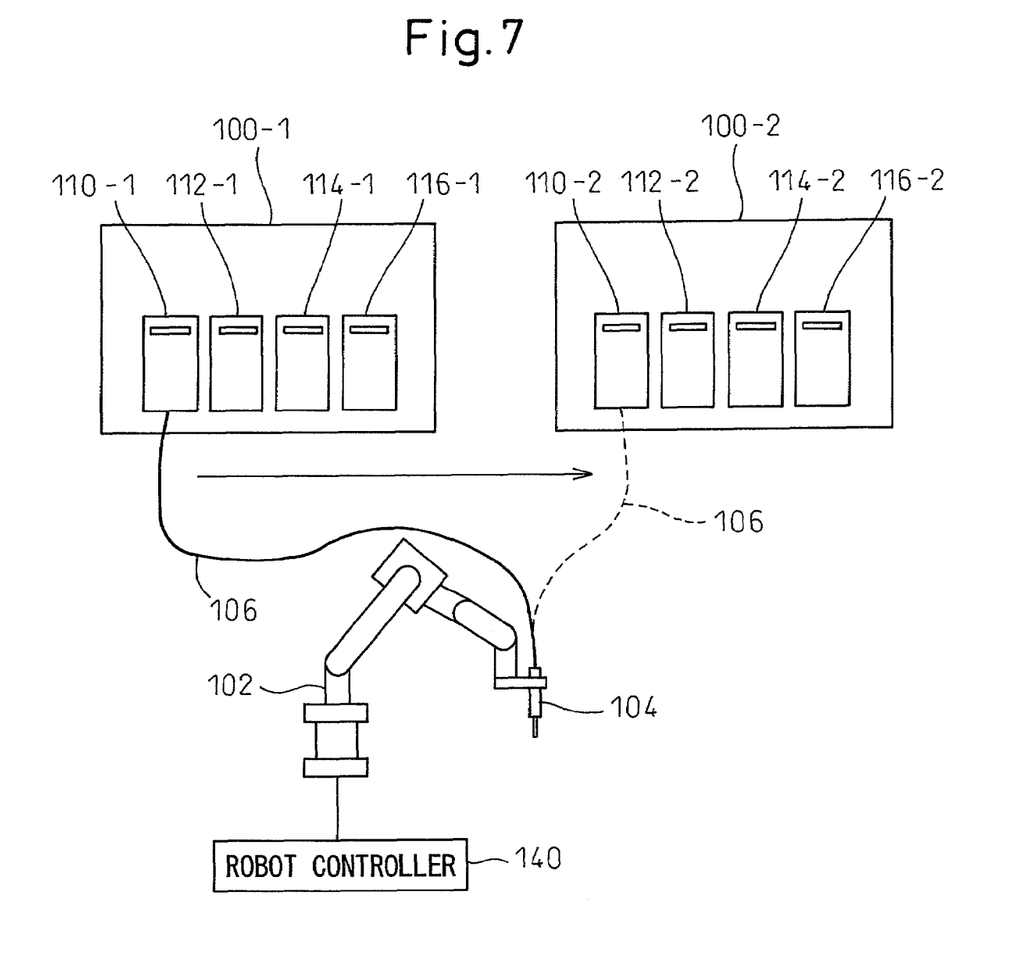
FIG. 7 is a diagram for explaining the operation of switching the laser oscillators.
Figure 8:
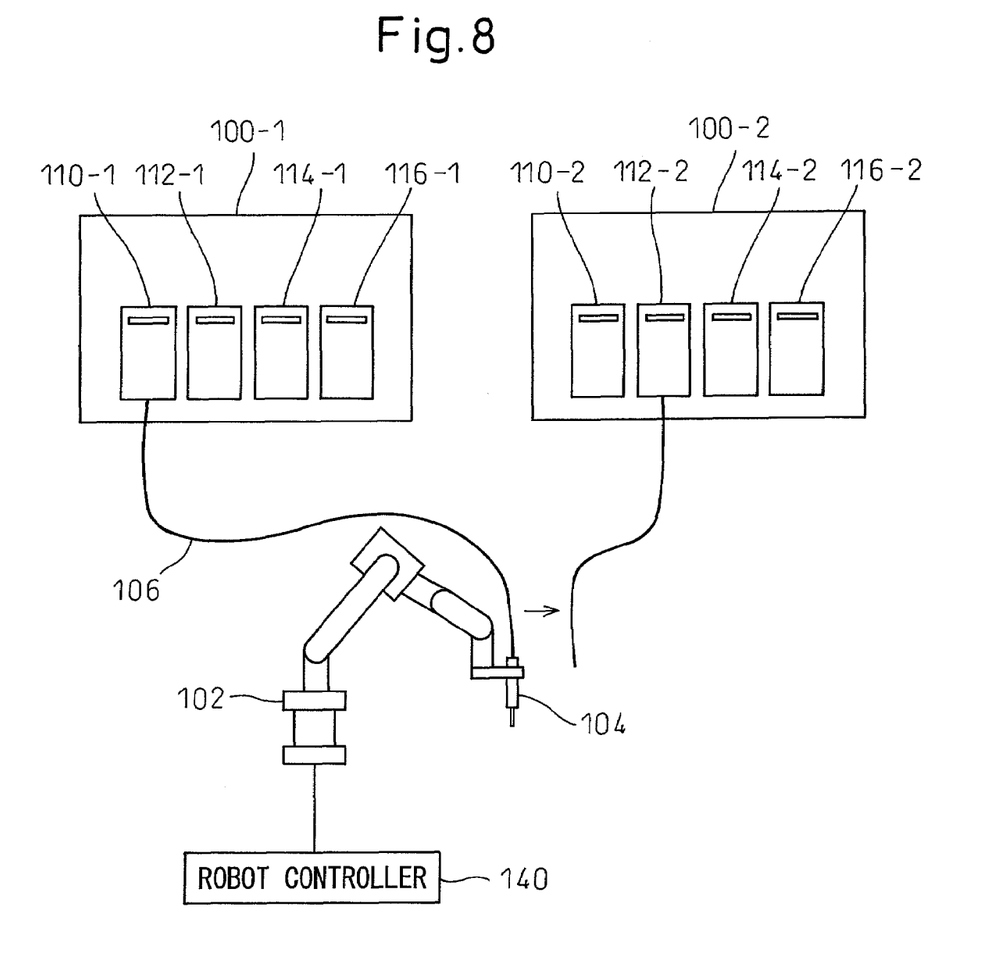
FIG. 8 is a diagram for explaining the operation of switching the laser oscillators.

In the cases shown in FIGS. 6 and 7, the laser oscillators 100-1, 100-2 use the first shutters 110-1, 110-2, respectively. In switching the oscillators, therefore, the shutter number command for the shutter which is opened when the processing operation need not be changed. In the case where the first shutter 110-1 is used for the laser oscillator 100-1 and the second shutter 112-2 is used for the laser oscillator 100-2 as shown in FIG. 8, however, the shutter number command must be changed when switching the laser oscillators.

After switching the optical fiber for the laser oscillator, the processing command from the robot must be transmitted to the laser oscillator after switching. The processing command from the robot, if currently transmitted to the laser oscillator 100-1, must be transmitted to the laser oscillator 100-2 after switching from the laser oscillator 100-1 to the laser oscillator 100-2.

Figure 9A:
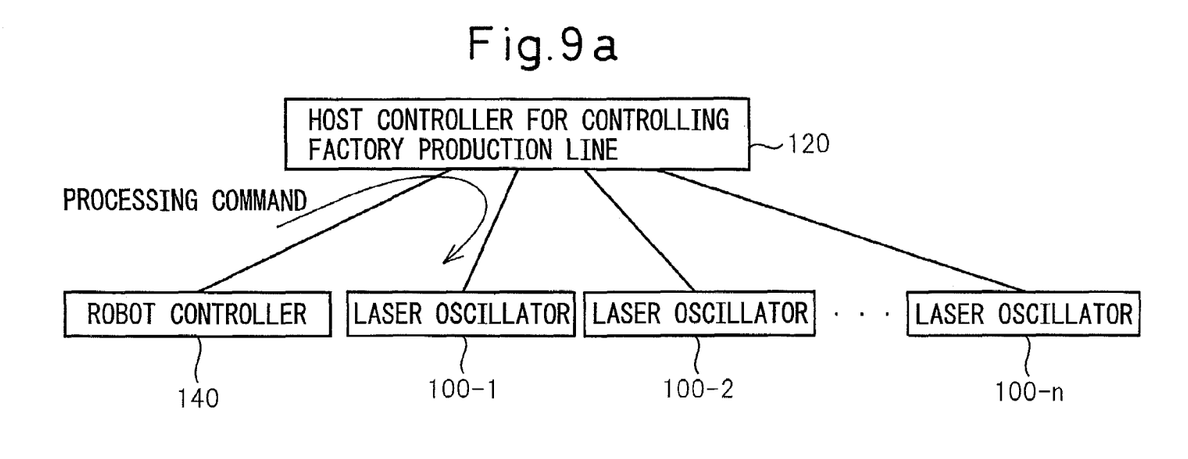
FIG. 9a is a block diagram showing a general configuration of a conventional robot laser machining system.
Figure 9B:
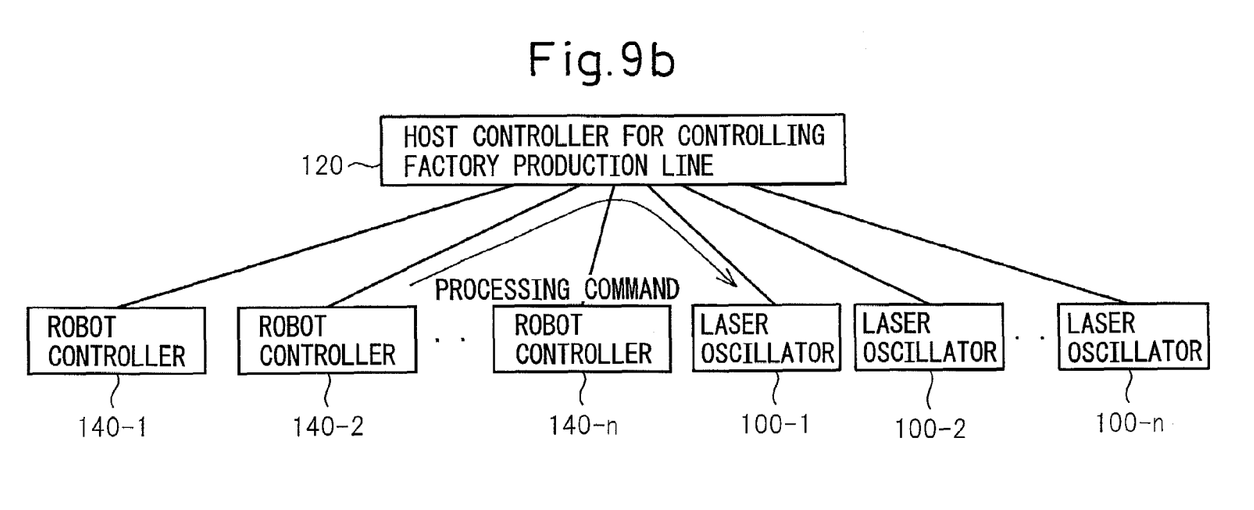
FIG. 9b is a block diagram showing a general configuration of another conventional robot laser processing system.

FIGS. 9a, 9b are block diagrams showing a general configuration of the conventional robot laser processing system. As shown in FIG. 9a, in the conventional robot laser processing system, a host controller 120 (programmable logic controller, PLC) is directly connected with one robot controller 140 and a plurality of laser oscillators 100-1, 100-2, . . . , 100-n. Also, in the case of FIG. 9b having a plurality of robot controllers 140-1, 140-2, . . . , 140-n, the host controller 120 is connected directly with the plurality of the robot controllers 140-1, 140-2, . . . , 140-n and a plurality of laser oscillators 100-1, 100-2, . . . , 100-n.

In the robot laser processing system shown in FIGS. 9a, 9b, the laser oscillator used by the robot under the control of the robot controller 140 is not selectively switched by an instruction from the host controller (PLC, etc.). The laser processing command from one robot controller 140 (or 140-1) is provisionally transmitted to the host controller 120, and then to the desired laser oscillator 100-1 (or 100-2) by the host controller 120. Specifically, this selective switching operation is performed by the host controller 120 changing the destination of the laser processing command. Also, the host controller 120 similarly changes the shutter number for the desired laser oscillator.

As described above, the host controller 120 is required to perform the control operation to switch the laser oscillator in addition to the normal line control operation and the robot control operation. As a result, the control operation in the host controller 120 is more complicated and leads to the problem that a considerable length of time is required to start the production line.

The fact that the laser processing command is sent through the host controller 120, on the other hand, causes loss of time and lengthens the cycle time.

Also, the host controller 120, while controlling the factory production line in general, on the one hand, is required to meet different specifications in accordance with different line configurations, on the other hand. In the case where the host controller 120 executes the operation of switching the laser oscillators as described above, therefore, the problem is posed that the internal processing of the host controller 120 is complicated and a considerable length of time is required each time the production line is started.

This invention is intended to solve these technical problems of the prior art, and the object thereof is to provide a robot laser processing system in which a processing command and a switching command can be sent directly to the laser oscillators from the robot controller without the intermediary of the host controller.

SUMMARY OF THE INVENTION

In order to achieve the aforementioned object, according to a first aspect of the invention, there is provided a robot laser processing system comprising at least one robot controller for controlling at least one robot, a host controller connected to the robot controller through a first network for controlling the robot controller collectively, and a plurality of laser oscillators connected to the robot controller through a second network and adapted to be selectively connected to a particular processing nozzle mounted on each robot, wherein the instruction from the host controller is transmitted to the robot controller through the first network, so that the robot controller determines the laser oscillator to be controlled and directly controls the particular laser oscillator through the second network.

According to a second aspect of the invention, there is provided a robot laser processing system of the first aspect, wherein the robot controller recognizes the laser oscillator connected to the processing nozzle of the robot to be controlled, based on the information on the laser oscillator sent from the host controller to the robot controller.

According to a third aspect of the invention, there is provided a robot laser processing system of the first aspect, wherein the instruction from the host controller constitutes an input signal to the robot controller.

According to a fourth aspect of the invention, there is provided a robot laser processing system of the first aspect, wherein the instruction from the host controller constitutes communication data to the robot controller.

According to a fifth aspect of the invention, there is provided a robot laser processing system of the second aspect, wherein the information on the laser oscillator constitutes a unique number assigned to the laser oscillator.

In the robot laser processing system according to this invention, the laser oscillator used for the processing control operation by the robot connected to the robot controller can be determined by the robot controller in accordance with an instruction from a host controller, such as a factory production line control unit (PLC), connected with the robot controller. As a result, the processing command is issued through the direct route from the robot controller to the laser oscillator and the cycle time is shortened. Also, the processing operation of the line control unit in control of the whole factory production line is simplified and the load on the host controller is reduced, while at the same time shortening the start-up time of the production line.

The above and other objects, features and advantages will be made apparent by the detailed description taken in conjunction with the accompanying drawings.

DETAILED DESCRIPTION

Embodiments of the invention are described below with reference to the accompanying drawings. In the drawings, similar members are designated by similar reference numerals, respectively. To facilitate understanding, the scales of the drawings are appropriately changed.

Figure 1:
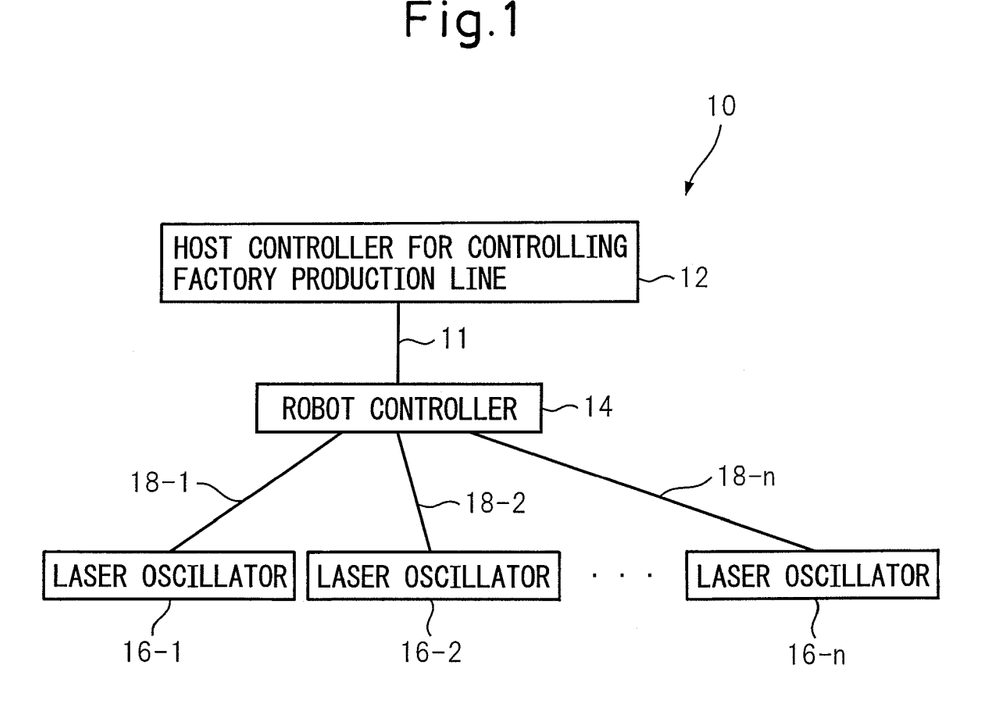
FIG. 1 is a block diagram showing a general configuration of a robot laser processing system according to a first embodiment of the invention.

FIG. 1 is a block diagram showing a general configuration of a robot laser processing system according to a first embodiment of the invention. The robot laser processing system 10 according to the first embodiment comprises a host controller 12 used for controlling a factory production line, a robot controller 14 connected to the host controller 12 through a first communication network 11, and a plurality of laser oscillators 16-1 to 16-$n$ connected to the robot controller 14 through second communication networks 18-1 to 18-$n$. The host controller 12 can be configured of, for example, a PLC (programmable logic controller).

Figure 2:
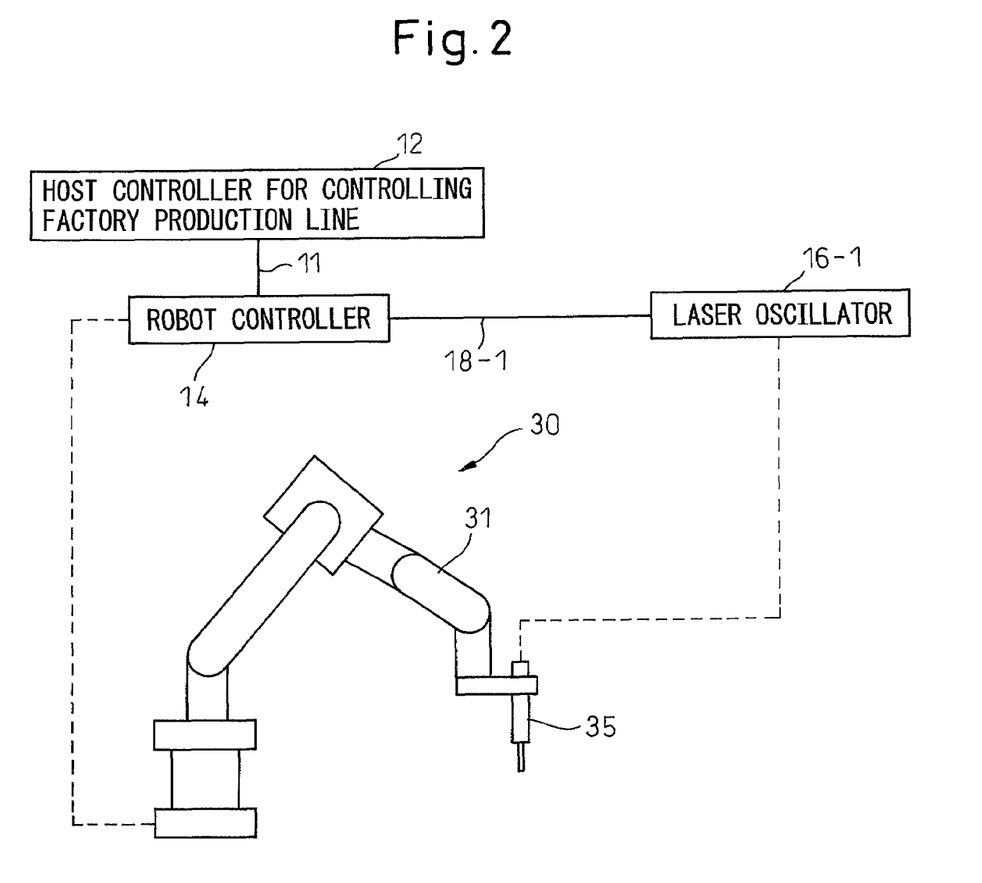
FIG. 2 is a schematic diagram showing the relations between a robot, a robot controller and a laser oscillator.

FIG. 2 is a schematic diagram showing the relation between the robot, the robot controller and the laser oscillator. To facilitate understanding, FIG. 2 shows only one robot 30 and one laser oscillator 16-1. As shown in FIG. 2, the robot 30 controlled by the robot controller 14 is assumed to be an industrial multi-joint robot including a robot arm 31 having a plurality of rotatably coupled arm members. A processing nozzle 35 for emitting a laser beam is mounted at the forward end of the robot arm. The processing nozzle 35, as explained above with reference to the prior art, is selectively connectable to one of the plurality of the laser oscillators 16-1 to 16-$n$ through an optical fiber or, specifically in FIG. 2, to the laser oscillator 16-1. The communication networks 11, 18-1 to 18-$n$ may be formed of, for example, a signal line, a field bus, the Ethernet (registered trade mark) network based on IEEE802.3 or a serial communication network constituting a digital network used for in-factory communication between measuring and control instruments.

The switching operation of the optical fiber to determine which one of the plurality of the laser oscillators 16-1 to 16-$n$ is selected and connected to the processing nozzle, as described above, can be performed by manually removing the optical fiber connected to the processing nozzle and newly connecting an optical fiber to be connected to the processing nozzle or, as disclosed in Japanese Unexamined Patent Publication No. 2001-259870, performed automatically by an optical fiber switching device (not shown). In the case where the switching operation of the optical fiber is performed automatically using the optical fiber switching device, the optical fiber switching device is connected to the host controller 12 by a third network not shown and controlled by the host controller 12.

The robot controller 14 has a well-known configuration which, in addition to a shaft control amplifier used for servo control of each shaft of the robot, includes a CPU, a memory, a communication interface for conducting communication through the first communication network 11 and the second communication networks 18-1 to 18-$n$, input means (not shown) such as a keyboard used by the operator to operate the robot controller 14 and output means, such as a monitor, for displaying the processing conditions.

Figure 3:
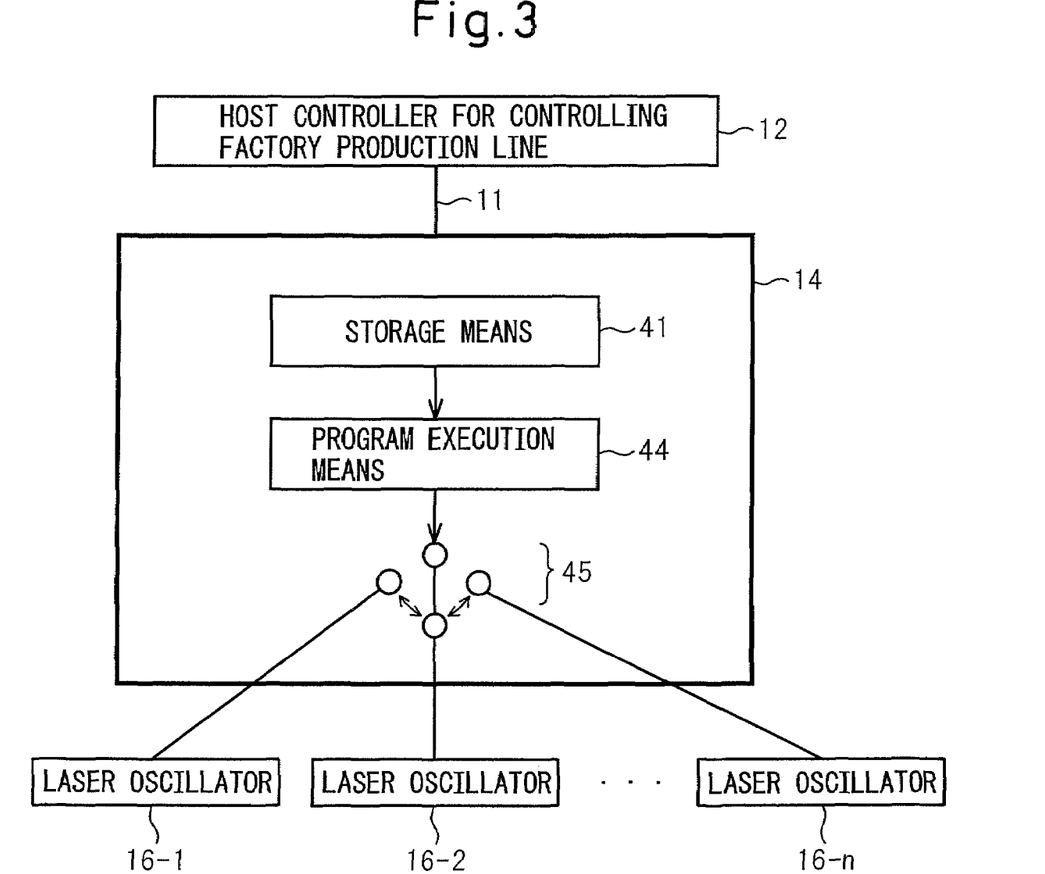
FIG. 3 is a block diagram showing the robot controller.

FIG. 3 is a block diagram showing a robot controller. A processing program for processing a work with a laser can be stored in a memory, i.e. a storage means 41 of the robot controller 14. The processing program is read from the storage means 41 and then executed by a program execution means 44, so that the robot is moved along the route designated by the program.

Figure 4:
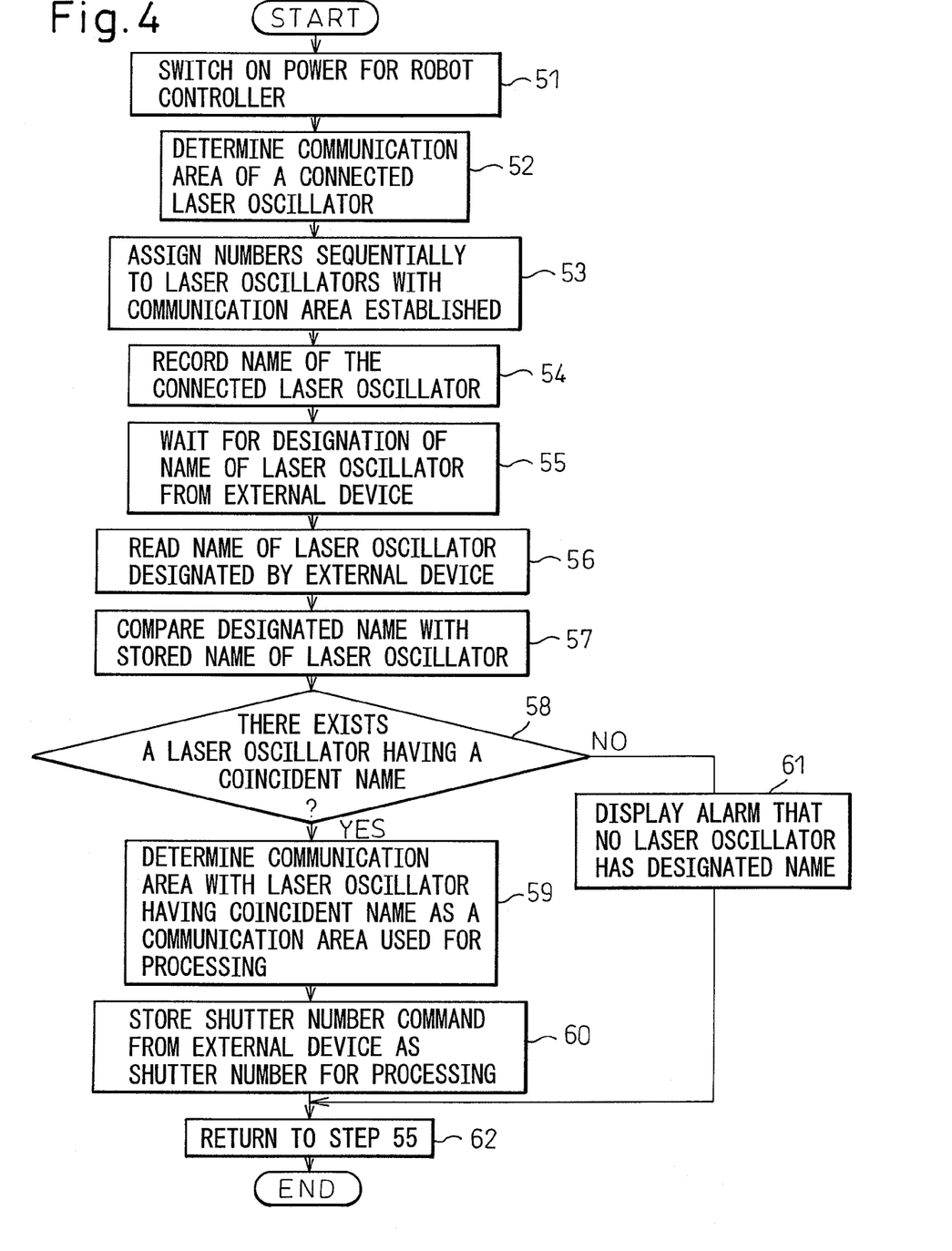
FIG. 4 is a diagram showing a processing program of the robot laser processing system according to the first embodiment of the invention.

FIG. 4 is a diagram showing a processing program of the robot laser processing system according to the first embodiment of the invention. With reference to FIG. 4, the operation of the first embodiment of the invention is explained below.

When the power for the robot controller 14 is turned on (step 51), the robot controller 14 first establishes communication with the laser oscillators 16-1 to 16-n. In the process, the communication area of each of the laser oscillators 16-1 to 16-n is determined (step 52), after which the laser oscillators 16-1 to 16-n are assigned the numbers in the order of determination of the communication areas, which numbers are stored in the storage means 41 (step 53). In the case where the instruction described later from the host controller 12 contains any of the names of the laser oscillators 16-1 to 16-n, the names of the laser oscillators are also sequentially stored in the storage means 41 (step 54). Upon completion of these steps, the robot controller 14 of the robot laser processing system 10 enters a standby state waiting for an instruction from the host controller 12 (external device) (step 55). In the case where the instruction from the host controller 12 contains any of the unique numbers of the laser oscillators 16-1 to 16-n, the unique numbers of the laser oscillators 16-1 to 16-n are stored in place of the names of the laser oscillators 16-1 to 16-n.

In step 56, the instruction sent from the external device, i.e. the host controller 12 through the first communication network 11 is read. The instruction from the host controller 12 is a signal input, for example, through an input line. Alternatively, the instruction from the host controller 12 may be communication data such as an IP address for the Ethernet (registered trade mark) or a port number for serial communication. In FIG. 4, the instruction from the host controller 12 contains the name of the laser oscillator, thus, the name is also read.

Then, the name of the laser oscillator stored in step 54 is compared with the name of the laser oscillator contained in the instruction from the host controller 12 (steps 57, 58). In the case where there exists a laser oscillator having a coincident name, the process proceeds to step 59 but, in the absence of the laser oscillator having a coincident name, the process proceeds to step 61. As described above, the unique numbers of the laser oscillators 16-1 to 16-n may alternatively be compared.

In step 59, the communication area of the laser oscillator having the name, etc. is determined by the selective switching unit 45 of the robot controller 14 as a communication area to be used in the laser processing process. In the case where the name, etc. of the laser oscillator 16-2 is contained in the instruction from the host controller 12, for example, the selective switching unit 45 selects the laser oscillator 16-2 of the laser oscillators 16-1 to 16-n (see FIG. 3).

The instruction from the host controller 12 also contains the shutter number used for the laser oscillator. In step 60, therefore, the shutter number in the instruction is also read and stored in the storage means 41 as a shutter number for use at the time of instructing laser processing. In the case where a coincident name, etc. of a laser oscillator does not exist in step 58, the process proceeds to step 61 in which the fact is indicated by alarm on a monitor or the like. After that, the process returns to step 55 to set the robot controller 14 in standby state.

When the robot controller 14 confirms the laser oscillator to be controlled in this way, the robot controller 14 executes the processing program in accordance with the robot start/stop command sent from the host controller 12 through the first communication network 11. Thus, the robot is moved along the route designated by the program, while performing the on/off control and power control operation of the laser output of the selected laser oscillator through the second communication networks 18-1 to 18-n. In the process, the shutter number command, used to open the shutter during laser processing, is sent out to the laser oscillator based on the shutter number input from the host controller 12 and used in the laser oscillator.

As described above, in the robot laser processing system 10 according to this invention, the laser oscillator used by the robot connected to the robot controller for the processing control operation can be determined by the robot controller 14 in accordance with the instruction from the host controller 12. According to this invention, therefore, a processing command can be sent directly to the laser oscillator 16 from the robot controller 14 without the intermediary of the host controller 12. As can be understood from FIG. 1, according to this invention, the processing command is transmitted directly through the route from the robot controller 14 to the laser oscillator 16. As compared with the conventional technique shown in FIG. 6, therefore, the cycle time can be shortened. Also, as the laser processing command from the host controller 12 to the robot controller 14 is eliminated, the overall process of the host controller 12 for controlling the whole factory production line can be simplified. Thus, the load on the host controller 12 is reduced while, at the same time, making it possible to start the production line in a shorter time.

In the operation of establishing communication, a table describing the host controller 12 and corresponding nodes and addresses of the laser oscillators 16-1 to 16-n may be stored in the storage means of the robot controller 14 and read by the CPU to execute a communication protocol. In such a case, the robot controller 14 confirms which one of the laser oscillators 16-1 to 16-n is connected to the processing nozzle of the robot controlled by this robot controller 14. The address may be the DL (data link) address in the case where the communication networks 11, 18-1 to 18-n are field buses, the IP address in the case where they are Ethernets (registered trade mark) or the port number in the case where they are serial communication networks.

Figure 10:
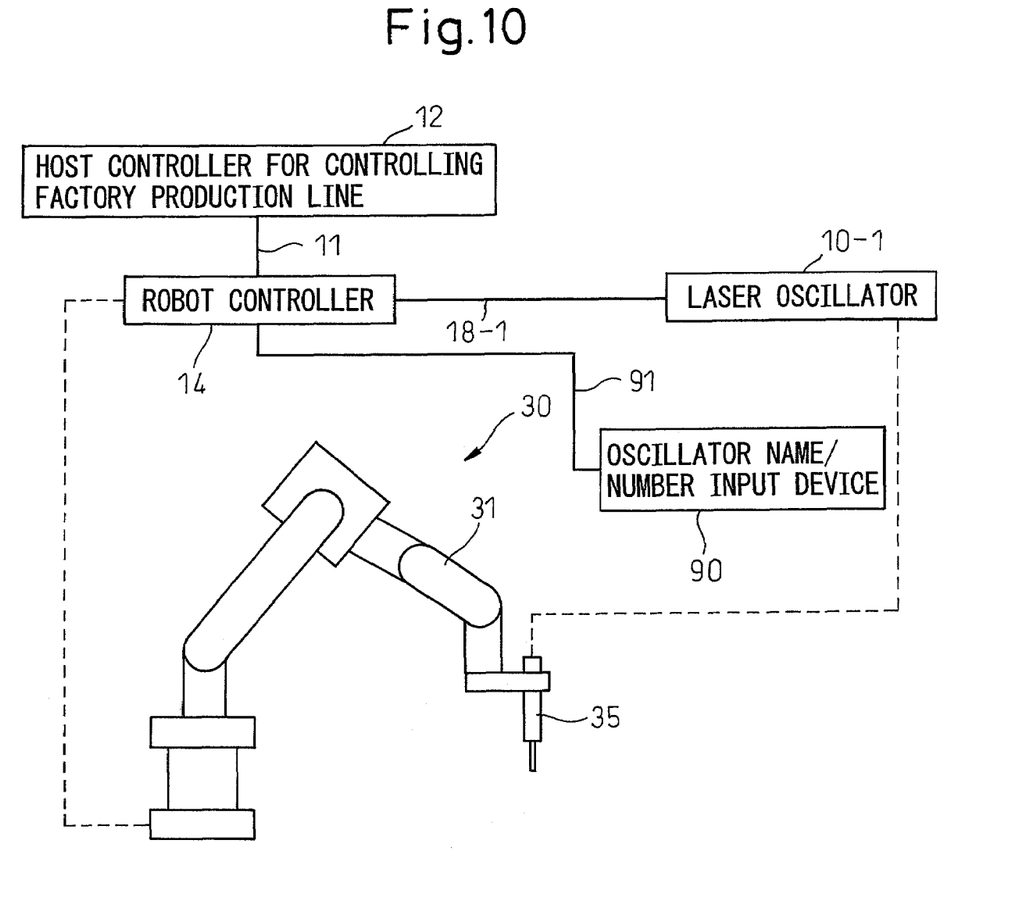
FIG. 10 is another block diagram including the robot controller.

In the case where the switching operation of the optical fiber is manually carried out, on the other hand, the name or unique number indicating any of the connected laser oscillators 16-1 to 16-n and the command number of the optical fiber may be input directly by the operator to the robot controller 14 through the keyboard, and read by the robot controller 14. Also, as can be understood from the block diagram of FIG. 10 showing another configuration of the robot controller 14, an oscillator name/number input device 90 may be connected to the robot controller 14 through the communication network 91. The oscillator name/number input device 90 can be used to input the unique number of the laser oscillator and the command number of the optical fiber in addition to the name of the laser oscillator. As shown in FIG. 10, the name and the unique number of the laser oscillator and the command number of the optical fiber are input by way of the oscillator name/number input device 90, and the resultant signal may be sent to the robot controller 14 through the communication network 91. Further, in the case where the switching operation of the optical fiber is carried out automatically by use of the optical fiber switching device, the name and the unique number of any one of the laser oscillators 16-1 to 16-n which is connected to the robot controller 14 and the command number of the optical fiber are sent to the robot controller 14 from the host controller 12 through the communication network 11 and may be read by the robot controller 14.

Figure 5:
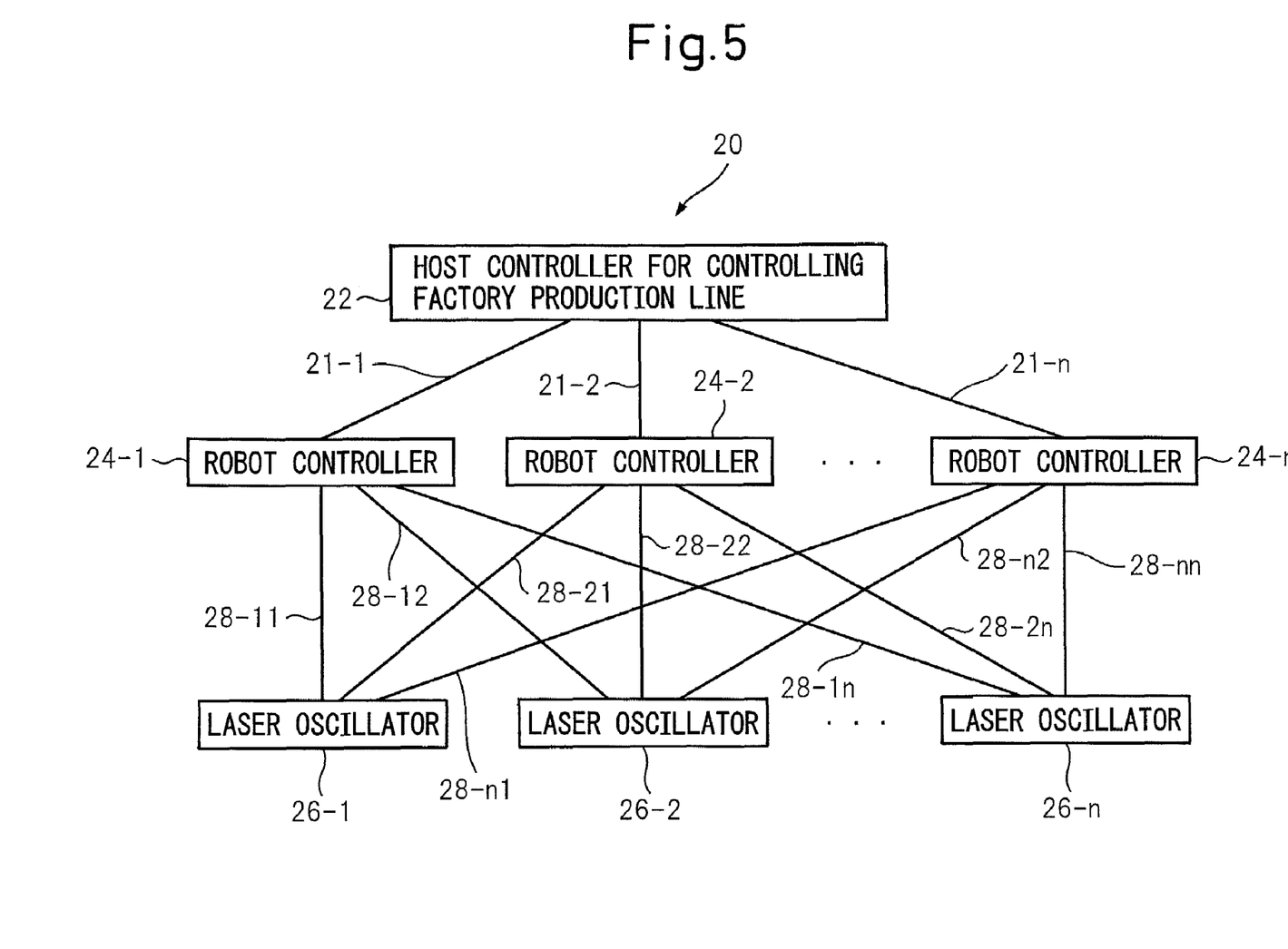
FIG. 5 is a block diagram showing a general configuration of the robot laser processing system according to a second embodiment of the invention.

Next, with reference to FIG. 5, the robot laser processing system according to a second embodiment of the invention will be briefly described.

The robot laser processing system 20 according to the second embodiment includes a host controller 22 used for controlling the factory production line, robot controllers 24-1 to 24-n connected to the host controller 22 through first communication networks 21-1 to 21-n and a plurality of laser oscillators 26-1 to 26-n connected to the robot controllers 24 through second communication networks 28-11 to 28-nn.

In FIG. 5, each robot controlled by the robot controllers 24-1 to 24-n includes a robot arm 31 having a plurality of rotatably coupled arm members, and a processing nozzle 35 mounted at the forward end of the robot arm. Each processing nozzle is selectively connectable to only one of the plurality of the laser oscillators 26-1 to 26-n through an optical fiber without any overlap. The networks 21-1 to 21-n and 28-11 to 28-nn, as in the first embodiment, can be constituted of field buses, Ethernets (registered trade mark) based on IEEE802.3 or serial communication networks. The robot controllers 24-1 to 24-n are configured in similar manner to the robot controller 14 according to the first embodiment and will not be described in detail.

Also according to this embodiment, the operation of switching the optical fiber can be performed manually by removing the optical fiber from the processing nozzle and newly connecting an optical fiber to the other processing nozzle to be connected or automatically using the optical fiber switching device (not shown) disclosed in Japanese Unexamined Patent Publication No. 2001-259870.

In this case, the robot controllers 24-1 to 24-n establish communication with the host controller 22 and the laser oscillators 26-1 to 26-n. As in the first embodiment, each of the robot controllers 24-1 to 24-n compares the name, etc. contained in the instruction from the host controller 12 with the stored name, etc. and, in the case where the particular names coincide with each other, the corresponding laser oscillator is used and the shutter number is also stored.

Each of the robot controllers 24-1 to 24-n, upon confirmation of the laser oscillator to be controlled thereby in this way, executes the processing program in accordance with the robot start/stop command sent from the host controller 22 through the first communication networks 21-1 to 21-n. Thus, the robot is moved along the route designated by the program, on the one hand, and the on/off control and the power control of the laser output to the selected laser oscillator are performed through the second communication networks 28-11 to 28-nn, on the other hand. As a result, effects similar to those of the first embodiment are obtained.

Although the invention is described above with reference to typical embodiments thereof, it will be understood, by those skilled in the art, that the invention can be variously altered as described above or otherwise, or added to, without departing from the scope of the invention.

What is claimed is:

1. A robot laser processing system comprising:
   at least one robot controller for controlling at least one robot;
   a host controller connected to the robot controller through a first network for overall control of at least the robot controller; and
   a plurality of laser oscillators selectively connectable through an optical fiber to the processing nozzle mounted on each of the at least one robot and connected to the robot controller through a second network;
   wherein an instruction from the host controller is transmitted to the robot controller through the first network, so that the robot controller determines a laser oscillator to be controlled and directly controls the laser oscillator through the second network.

2. The robot laser processing system according to claim 1, wherein the robot controller recognizes the laser oscillator connected to the processing nozzle of the robot to be controlled, based on the information on the laser oscillator sent from the host controller to the robot controller.

3. The robot laser processing system according to claim 1, wherein the instruction from the host controller constitutes an input signal to the robot controller.

4. The robot laser processing system according to claim 1, wherein the instruction from the host controller constitutes communication data to the robot controller.

5. The robot laser processing system according to claim 2, wherein the information on the laser oscillator constitutes a unique number assigned to the laser oscillator.

* * * * *